United States Patent
Davoine-Rondon et al.

(10) Patent No.: US 11,309,748 B2
(45) Date of Patent: Apr. 19, 2022

(54) WIRELESS AND CONTACTLESS ELECTRICAL ENERGY TRANSFER ASSEMBLY COMPRISING AN IMPROVED SYSTEM FOR REGULATING THE TRANSFERRED ENERGY

(71) Applicant: RADIALL SA, Aubervilliers (FR)

(72) Inventors: Eliana Davoine-Rondon, Bourg-Saint-Christophe (FR); Jean-Paul Chapelle, Villeurbanne (FR); Emeline Garioud-Aldeguer, Meximieux (FR)

(73) Assignee: RADIALL, Aubervilliers (FR)

( * ) Notice: Subject to any disclaimer, the term of this patent is extended or adjusted under 35 U.S.C. 154(b) by 0 days.

(21) Appl. No.: 17/186,720

(22) Filed: Feb. 26, 2021

(65) Prior Publication Data

US 2021/0273493 A1    Sep. 2, 2021

(30) Foreign Application Priority Data

Mar. 2, 2020    (FR) ...................................... 2002098

(51) Int. Cl.
*H02J 50/80* (2016.01)
*H02J 50/10* (2016.01)

(52) U.S. Cl.
CPC .............. *H02J 50/80* (2016.02); *H02J 50/10* (2016.02)

(58) Field of Classification Search
CPC ........ H02J 50/80; H02J 50/10; H04B 5/0037; H04B 5/0081
USPC ....................................................... 307/149
See application file for complete search history.

(56) References Cited

U.S. PATENT DOCUMENTS

| | | | |
|---|---|---|---|
| 5,608,417 A * | 3/1997 | de Vall ............. | G06K 19/07784 343/895 |
| 6,040,986 A | 3/2000 | Sakamoto et al. | |
| 9,461,364 B2 * | 10/2016 | Lee ......................... | H02J 7/025 |
| 9,461,507 B2 * | 10/2016 | Takahashi ............... | H02J 50/70 |
| 9,866,059 B2 * | 1/2018 | Niizuma ................. | H02J 50/90 |
| 2004/0085247 A1 * | 5/2004 | Mickle ................. | H01Q 1/2225 343/701 |
| 2011/0227420 A1 * | 9/2011 | Urano .................. | H04B 5/0081 307/104 |
| 2016/0181868 A1 * | 6/2016 | Casse ..................... | H01Q 1/248 307/104 |

(Continued)

FOREIGN PATENT DOCUMENTS

| | | |
|---|---|---|
| EP | 3 923 182 A2 | 6/1999 |
| EP | 2 367 263 A2 | 9/2011 |

(Continued)

OTHER PUBLICATIONS

French Search Report for corresponding French Application No. FR 2002098 dated Sep. 3, 2020.

*Primary Examiner* — Alfonso Perez Borroto
(74) *Attorney, Agent, or Firm* — Pearne & Gordon LLP

(57) ABSTRACT

The application comprises a system for regulating the transfer of energy in a contactless and wireless assembly, the regulation that is implemented in continuously measuring the voltage and/or the current directly at the output of the rectifier of the receiving part Rx of the assembly, and then in generating error signals from this/these measurement(s) and in transmitting them back to the transmitting part Tx via a communication that is independent of the transmitted power.

9 Claims, 4 Drawing Sheets

(56) References Cited

U.S. PATENT DOCUMENTS

2020/0036216 A1    1/2020  Wan

FOREIGN PATENT DOCUMENTS

| EP | 3 462 564 A1 | 4/2019 |
| FR | 3038204 A1 | 12/2016 |
| FR | 3067876 A1 | 12/2018 |
| JP | 2006-074848 A | 3/2006 |

* cited by examiner

[Fig 1]
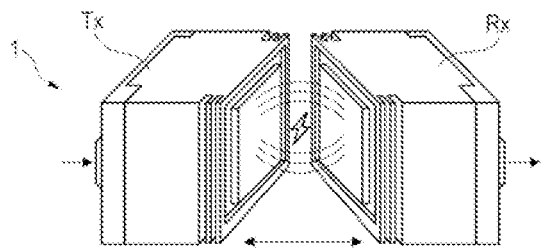
[Fig 2]
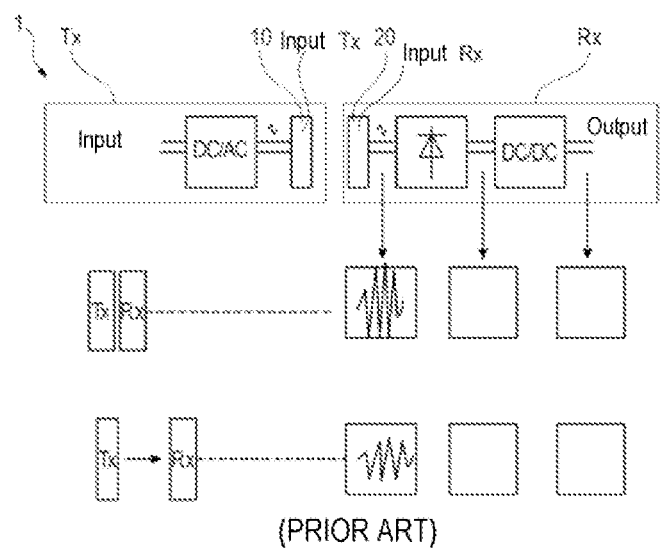
(PRIOR ART)
[Fig 3A]
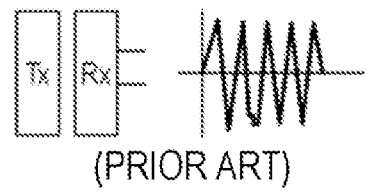
(PRIOR ART)
[Fig 3B]
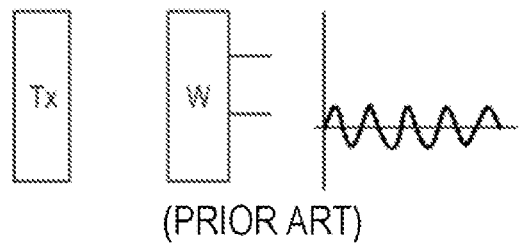
(PRIOR ART)

[Fig 4]
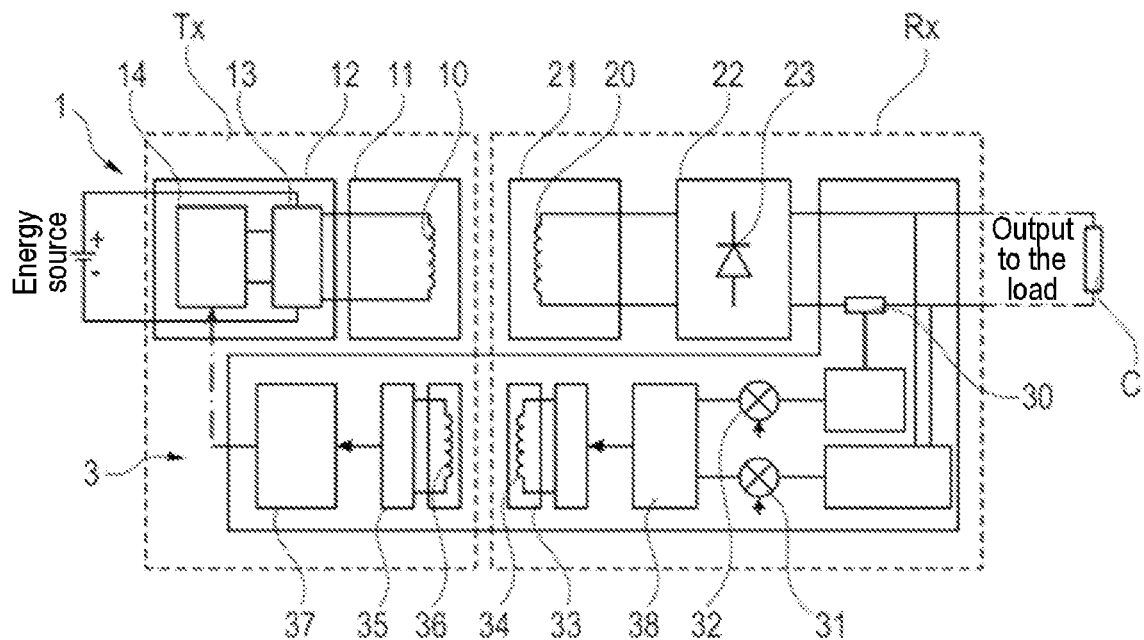
[Fig 5]
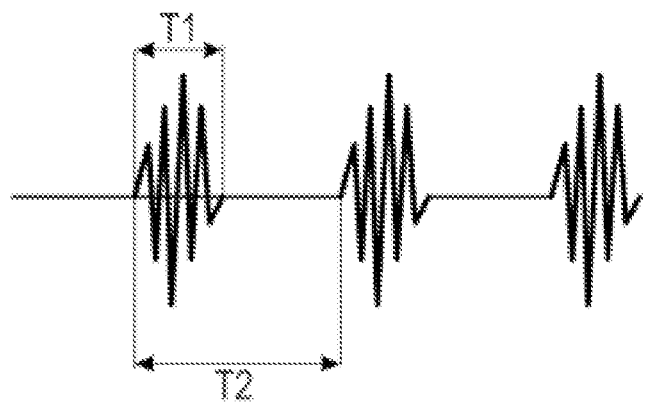

[Fig 6A]
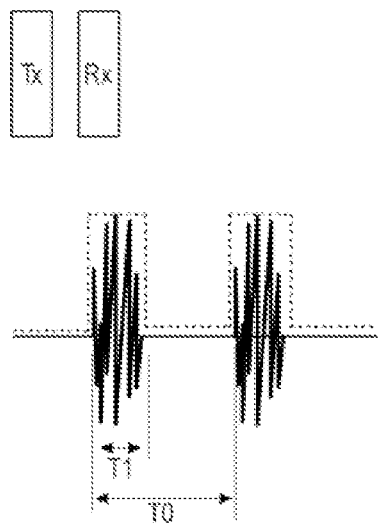
[Fig 6B]
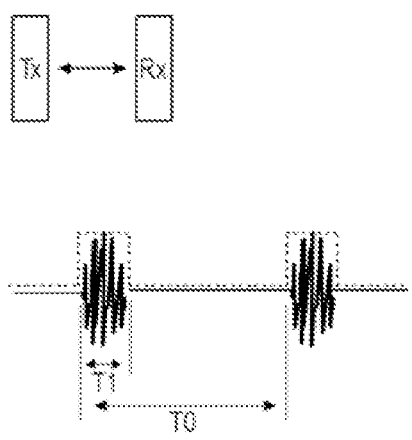

[Fig 7]
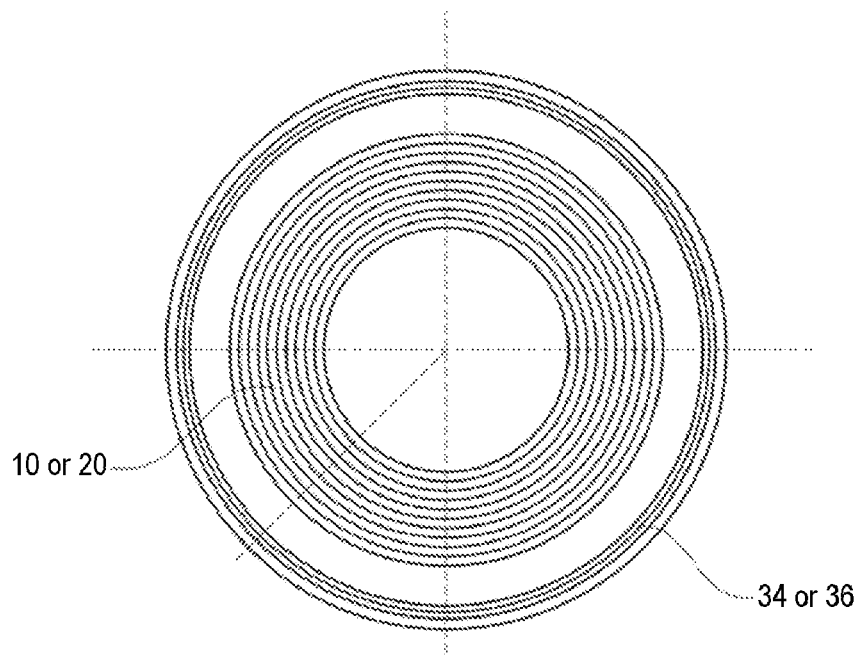
[Fig 8]
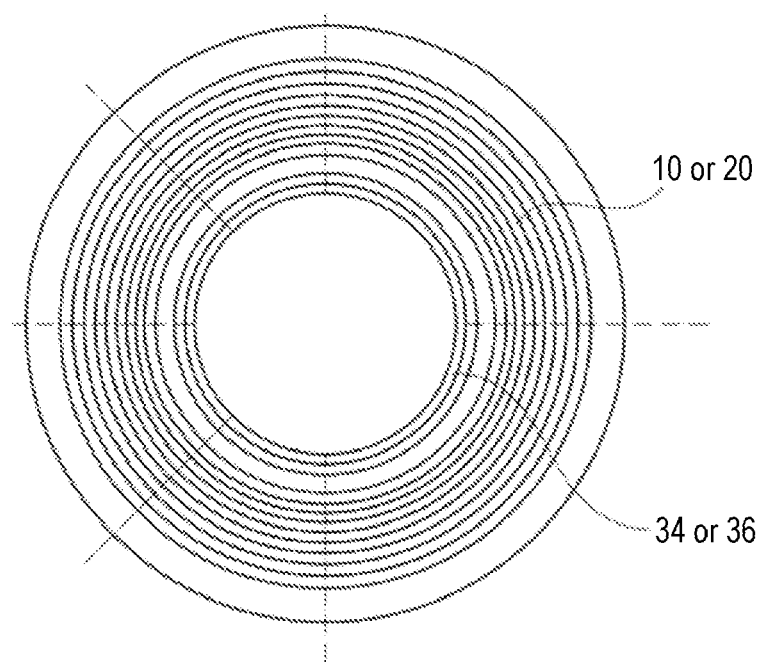

WIRELESS AND CONTACTLESS ELECTRICAL ENERGY TRANSFER ASSEMBLY COMPRISING AN IMPROVED SYSTEM FOR REGULATING THE TRANSFERRED ENERGY

Wireless and contactless electrical energy transfer assembly comprising an improved system for regulating the transferred energy

TECHNICAL FIELD

The present invention relates to the field of wireless and contactless electrical energy transfer assemblies.

It relates more specifically to a system for regulating the transfer of energy in these assemblies, which makes it possible to adjust the transmitted energy flow on the basis of the load and of the distance between the transmitting and receiving parts. The invention is particularly applicable for supplying electric power through a wall of an embedded system, such as a sensor, supplying power to/charging electric vehicles, supplying power to/charging a device in a harsh environment (vibrations, humidity, salt spray, etc.). This may for example be a power supply for tools/machines through a glazed wall, in particular in a nuclear environment. This may be a power supply through a wall of batteries and/or embedded sensors. An assembly according to the invention may also replace the power connectors that are used at present.

Generally speaking, a wireless and contactless energy transfer assembly according to the invention may be implemented in the home electronics sector, the automotive sector, the medical sector, the industrial sector, and in the fields of aerospace and defence.

PRIOR ART

Contactless electrical energy transfer assemblies usually consist of two parts:
- a first part, called transmitting part, connected to an external electrical energy supply source, and
- a second part, called receiving part, incorporating an electronic device for converting the energy transmitted from the transmitting part into an electricity source able to be used by the external output load.

As illustrated schematically in FIG. 1, the contactless transfer of energy makes it possible to transfer energy from the transmitting part, referenced Tx, to a receiving part Rx, without any electrical connection between these parts Tx, Rx, specifically in order to charge a battery or to supply power to electronic systems.

Two principles are involved in a contactless transfer of energy: near field and far field. The transmission vectors for the energy may be a laser, an electromagnetic field (coupling through magnetic induction, through magnetic resonance, capacitive coupling) as well as acoustic waves.

In a magnetic induction-based energy transfer assembly, the transmitting part Tx conventionally comprises a primary housing in particular accommodating the following:
- a primary coupling module comprising a primary coil and associated electromagnetic means, and
- a primary electronic module comprising electronic means, including a primary electronic converter.

The receiving part Rx conventionally comprises a secondary housing in particular accommodating the following:
- a secondary coupling module comprising a secondary coil and associated electromagnetic means, and
- a secondary electronic module comprising electronic means, including a secondary electronic converter.

The primary and secondary coils are galvanically isolated from one another. They have to be coupled to one another through magnetic induction. To this end, they have to be positioned close to one another and facing one another about an air gap, typically of the order of a few tens of mm. Specifically, one essential parameter for the contactless transfer of energy is the coupling between the primary coil and the secondary coil. This coupling therefore depends on the relative position of the secondary coil with respect to the primary coil.

The operation of the assembly for achieving the transmission of energy through electromagnetic induction is as follows.

An external electric power source supplies power to the primary electronic converter, which generates an AC electric current. This is injected into the primary coil, thereby generating an alternating magnetic field. The latter is sensed by the secondary coil, which generates an AC electric current in the secondary coil. The secondary electronic converter converts this AC current into a DC electrical energy source for a load at output of the receiving part.

One key problem in the abovementioned assemblies is that of providing a constant voltage and/or a constant current at output of the receiving part, that is to say for the load to be supplied with electric power.

The main variable parameters that influence this issue are the air gap, that is to say the distance and also the misalignment between the primary and secondary coils and, more generally, between the primary coupling module and the secondary one, as well as the variation in the load to be supplied with power.

The influence of the variation in the air gap is illustrated schematically in FIGS. 2, 3A and 3B: the greater the air gap between primary coil 10 and secondary coil 20, the lower the AC voltage at the output of the secondary coil 20 in comparison with the AC voltage at input of the primary coil 10, and therefore the voltage DC at output of the secondary rectifier.

To solve this problem, it may be contemplated to install, in the receiving part, an active converter for regulating the output voltage. Such a solution cannot be contemplated in reality for integration into the load of the secondary part, in particular when it is necessary to minimize the bulk of this secondary part. Specifically, adding an active converter increases the weight and the volume of the receiving part and reduces the efficiency of the entire assembly.

In fact, it is known to implement a regulation system in order to adjust the energy transmitted from the primary coupling module Tx to the secondary coupling module Rx in order to adapt the transmitted energy flow on the basis of the load to be supplied with power.

Without a regulation system, two scenarios may arise:
- insufficient transfer of energy from the primary coupling module to the secondary coupling module: the supply of power to the load with the desired power is no longer effective. This results in a reduction or even a shutdown of the operation of the assembly;
- an excessively high transfer of energy from the primary coupling module to the secondary coupling module: there is a risk of the secondary coupling module, receiving too much energy, being destroyed.

At present, a regulation system operates based on the feedback of information at least about the actual voltage at output from the receiving part to the transmitting part in order to slave the energy to be transmitted.

Regulation systems that currently exist may be classified into three categories, depending on the way in which the actual voltage at output is fed back to the transmitting part.

The first implements near-field communication (NFC) technology, which is a high-frequency short-range wireless communication technology.

The second consists of a radiofrequency (RF) link, of Bluetooth®, Wi-Fi, frequency modulation (FM), etc. type.

The third consists in superimposing a regulation signal on the power signal transmitted between the primary and secondary coils.

NFC technology and signal superimposition have the shared drawback of limiting the air gap between the primary and secondary coupling modules, typically to 20 mm and to 10 mm, respectively.

NFC technology has its transmission signal, which is subject to interference by the electromagnetic power transmitted by the primary coil, such that this generates transmission losses that may have consequences as severe as causing the regulation to fail completely. RF technology additionally entails a high risk of hacking and interference, that is to say the communication is less reliable.

Lastly, NFC technology limits possible applications since it does not allow signals to be transmitted for the regulation when the load to be supplied with power is moving (in translation/in rotation) and/or is arranged with a misalignment.

There is therefore a need to further improve regulation systems for contactless and wireless electrical energy transfer assemblies, in particular in order to overcome the above-mentioned drawbacks, and more particularly in order to eliminate transmission interference and application constraints.

The invention aims to meet this need in full or in part.

DISCLOSURE OF THE INVENTION

To this end, one subject of the invention, according to one of its aspects, is a contactless and wireless electrical energy transfer assembly comprising:

a transmitting part (Tx) comprising:

a primary coupling module with at least one primary coil, a primary electronic module comprising at least one DC/AC electronic converter designed to convert a DC current into an AC electric current to be injected into the primary coil, and a monitoring/control unit for the primary converter;

a receiving part (Rx), comprising:

a secondary coupling module with at least one secondary coil designed to achieve magnetic coupling with the primary coil, a secondary electronic module including a rectifier designed to convert the AC electric current received in the secondary coil in order to transfer DC electrical energy to a load at output of the receiving part;

a system for regulating the energy transferred from the transmitting part (Tx) to the receiving part (Rx), comprising:

in the receiving part:

electronic measuring and shaping means for measuring the current and/or the voltage at the output of the rectifier and shaping it/them, at least one comparator designed to compare the measured voltage and/or the measured current with a voltage instruction and/or current instruction, and electronic shaping means that generate signals, called error signals, on the basis of the energy level required at Rx, a transmission antenna for transmitting the error signals, the transmission antenna having at least one magnetic induction coil that is separate and designed to operate at a frequency different from the secondary coil, the transmission antenna coil being wound concentrically to the secondary coil;

in the transmitting part:

a reception antenna for receiving the error signals transmitted from the transmission antenna, the reception antenna having at least one magnetic induction coil that is separate and designed to operate at a frequency different from the primary coil, the reception antenna coil being wound concentrically to the primary coil, electronic processing means for processing the error signals, connected at input to the reception antenna and at output to the monitoring/control unit that is designed to regulate the energy of the primary converter;

in which system said electronic shaping means for shaping the error signals allow a frequency modulation ($1/T0$) of the current pulses and/or voltage pulses of fixed duration ($T1$) on the side of the receiving part Rx, said electronic processing means for processing the error signals allow a frequency demodulation ($1/T0$) of the error signals sent to the monitoring/control unit of the primary converter on the basis of the error signals, and wherein said respective transmission and reception antenna coils are wound concentrically to the secondary coil and the primary coil, respectively.

The invention thus consists of a system for regulating the transfer of energy in a contactless and wireless assembly, the regulation that is implemented consisting in continuously measuring the voltage and/or the current directly at the output of the rectifier of the receiving part Rx of the assembly, and then in generating error signals from this/these measurement(s) and in transmitting them back to the transmitting part Tx via a communication that is independent of the transmitted power. The processed signals are then sent to the monitoring/control unit for the primary converter, which sends commands to the latter. These control signals are frequency-modulated and/or pulse width-modulated on the basis of the error signals that are processed.

This has the effect of varying the energy transmitted by the transmitting part Tx.

Since the error is measured on the voltage and/or the current directly at the output of the rectifier of the receiving part, it is highly accurate.

The error signal transmitted between the receiving part Rx and the transmitting part Tx may incorporate data transmission in addition to regulation. The receiving part modulates the time $T1$ to code the item of data to be transmitted, and the transmitting part Tx demodulates the time $T1$ to decode the received item of data. For example, the item of data may be a request to shut down the receiver in the event of overheating thereof. When the transmitting part Tx receives this item of data, it stops transmitting energy for a few minutes so that the receiving part Rx cools down.

Choosing transmission and reception antennas with induction coils is particularly advantageous, as these in particular have a small footprint and are lightweight. They may also be housed perfectly well inside the space of housings already used for existing contactless energy transfer assemblies, in particular those described in patent application FR3067876A1 and patent FR3038204B1.

The concentric arrangement of the transmission coil and of the reception coil respectively in relation to the secondary coil and to the primary coil is possible because the operating frequency of the power coils (primary and secondary coil) is different from the operating frequency of the communication coils (transmission coil and reception coil). Care is however taken to comply with a minimum distance between a power coil and a communication coil, so that said communication coil does not interfere electromagnetically with the power that is transferred.

The minimum distance is typically of the order of 5 mm.

This frequency difference, as well as the concentric arrangement, minimize interference between the various electromagnetic fields, that is to say the one for the power to be transferred and the one that communicates error signals. Since the power transfer is subject to no or only very little interference, it is possible to transmit energy with a transmitting part and/or a receiving part that are at a distance from one another and/or in motion.

Thus, by virtue of the invention, with energy transmission interference being minimized with effective regulation, a perfectly reliable contactless and wireless transfer assembly is achieved. Furthermore, as already mentioned, it is made feasible and reliable to transfer energy with at least one part of the assembly in rotation, for example with a rotating receiving part Rx and a fixed transmitting part Tx. This thereby eliminates usage constraints from the prior art, which involved the two parts, the transmitting part and the receiving part, of a contactless energy transfer assembly having to be fixed during the transfer.

The advantages of regulating the energy transfer according to the invention are numerous and include:
- frequency modulation of the pulses is highly reliable, even with a considerable distance between the transmitting part Tx and receiving part Rx of the transfer assembly,
- the possibility of dispensing with an active AC/DC or DC/DC converter, thereby reducing the number of electronic components, simplifying integration and reducing size, typically by up to 50%, weight and bulk of the receiving part Rx of the transfer assembly,
- the possibility of integrating a contactless and wireless energy transfer assembly into environments in which the space available for loads is restricted,
- the possibility of producing a contactless and wireless energy transfer assembly with at least one of the modules moving in rotation.

The electronic measuring means for measuring the current at the output of the rectifier preferably comprise a shunt resistor at the output of the rectifier.

According to one advantageous variant embodiment, the electronic signal-processing means comprise a complex programmable logic circuit. This circuit is also called a CPLD, for complex programmable logic device.

During operation, this intelligent electronic component will analyse the frequencies (F0=1/T0) of the pulses of the power signals and the duration of these pulses (T1) to be transmitted by the primary coupling module and, on the basis of the received error signals, will return the regulation instruction to the monitoring/control unit for the primary converter. Advantageously, the electronic shaping means continuously generate the error signals when energy is being transferred.

Advantageously, the electronic shaping means make it possible to modulate the duration T1 of the error signals in the receiving part Rx and then to demodulate the duration T1 in the transmitting part Tx so as to transmit data from the receiving part Rx to the transmitting part Tx.

Advantageously, the distance between the transmission antenna coil and the secondary coil, on the one hand, and between the reception antenna coil and the primary coil, on the other hand, is between 0 and 15 mm.

Another subject of the invention is a device or a motor vehicle, comprising the receiving part and the part of the regulation system in the receiving part of the electrical energy transfer assembly as described above.

A final subject of the invention is the use of the electrical energy transfer assembly as described above for supplying electric power through a wall of an embedded system, such as a sensor, supplying power to/charging electric vehicles, supplying power to/charging a device in a harsh environment.

BRIEF DESCRIPTION OF THE DRAWINGS

FIG. 1 shows a schematic perspective view of one example of a contactless and wireless energy transfer assembly implementing coupling through electromagnetic induction according to the prior art.

FIG. 2 is a diagram showing the main components and the operating principle of a contactless and wireless energy transfer assembly according to the prior art, on the basis of the variation in the air gap between the transmitting part Tx and the receiving part Rx.

FIG. 3A is a diagram showing the value of the voltage at output of the receiving part in the case of a small air-gap distance between the transmitting part Tx and the receiving part Rx.

FIG. 3B is a diagram showing the value of the voltage at output of the receiving part in the case of a large air-gap distance between the transmitting part Tx and the receiving part Rx, for the same voltage at input of the transmitting part Tx as in FIG. 3A.

FIG. 4 is a diagram showing the main components and the operating principle of a contactless and wireless energy transfer assembly, with an energy transfer regulation system according to the invention.

FIG. 5 is a timing diagram of error signals sent in accordance with the regulation according to the invention from the receiving part Rx to the transmitting part Tx of an energy transfer assembly according to the invention.

FIG. 6A is a timing diagram of the frequency-regulated error signal according to the invention in a configuration with a small air gap between transmitting part Tx and receiving part Rx.

FIG. 6B is a timing diagram of the frequency-regulated error signal according to the invention in a configuration with a large air gap between transmitting part Tx and receiving part Rx.

FIG. 7 is a schematic front-on view of a transmitting or receiving part of a transfer assembly according to the invention, showing a first variant with a concentric arrangement between a power coil and a communication coil designed to communicate error signals used in the regulation according to the invention.

FIG. 8 is a schematic front-on view of a transmitting or receiving part of a transfer assembly according to the invention, showing a first variant with a concentric arrangement between a power coil and a communication coil designed to communicate error signals used in the regulation according to the invention.

DETAILED DESCRIPTION

In the entirety of the present application, the terms "input", "output", "upstream" and "downstream" should be understood with reference to the flow direction of the signals within a wireless and contactless energy transfer system according to the invention.

"Primary coil" and "secondary coil" in the context of the invention are understood to mean the coils via which the power to be transferred is transmitted and received, respectively, through electromagnetic induction.

"Transmission coil" and "reception coil" in the context of the invention are understood to mean the coils via which the error signals for the regulation according to the invention are transmitted through electromagnetic induction.

For the sake of clarity, the same reference numeral is used for the same element of an assembly according to the prior art and an assembly according to the invention.

FIGS. 1 to 3B have already been described in detail in the preamble. They will therefore not be commented upon below.

FIG. 4 shows one example of a contactless and wireless energy transfer assembly according to the invention, denoted overall by the reference 1. This assembly 1 is intended to supply electric power to a load C (equivalent resistance shown) through the energy from an energy source.

The transmitting part Tx first of all comprises a primary coupling module 11 comprising at least one primary coil 10.

The primary coupling module 11 is connected upstream to a primary electronic module 12 comprising at least one electronic converter 13 with its monitoring/control unit 14. This converter, for example a DC/AC converter 13, is supplied with power directly by the electric power source. This converter has a role of converting a DC current into an AC electric current to be injected into the primary coil 10.

The receiving part Rx, for its part, comprises a secondary coupling module 21 with at least one secondary coil 20 designed to achieve coupling through electromagnetic induction with the primary coil 10.

The secondary coupling module 20 is connected downstream to a secondary electronic module 22, including a half-wave rectifier 23. This half-wave rectifier has the role of converting the AC electric current received in the secondary coil 20 in order to transfer DC electrical energy to the load C at output of the receiving part.

The assembly that has just been described comprises an energy transfer regulation system 3.

This system 3 first of all comprises means for measuring the current and/or the voltage directly at the output of the rectifier 23. The current is preferably measured through a shunt resistor 30.

The measured voltage and/or the measured current are shaped and then compared, in a comparator 31, 32, with a respective voltage instruction and current instruction.

The error signals continuously generated at the output of the comparator or comparators 31, 32 are shaped by the module 38 and then transmitted by a transmission antenna 33. In the embodiment illustrated, this transmission antenna 33 is an antenna with an induction coil 34.

The error signals are then received by a reception antenna 35 in the transmitting part Tx. In the embodiment illustrated, this reception antenna 35 is an antenna with an induction coil 36.

A signal-processing unit 37 filters the signals received by the reception antenna 35, by taking an average so as then to send an instruction to the monitoring/control unit 14 for the primary converter 13 so that this generates control pulses with a modulated frequency and/or a modulated pulse width as desired depending on the error signals.

FIG. 5 shows the waveform of the periodic error signals transmitted to the reception antenna 35. The period T1 of a waveform is fixed, whereas the interval T0 varies depending on the amount of energy required by the receiving part Rx.

More specifically, if the voltage or the current varies at the output of the rectifier 23 with respect to the voltage or the current desired for the load, the frequency (1/T0) will change in the receiving part Rx.

For example, if the voltage is greater than the voltage desired for the load, the frequency (1/T0) decreases. By contrast, if the voltage is lower, the frequency (1/T0) increases.

By virtue of the abovementioned regulation, the instruction given to the primary converter 13 is to increase the power.

FIG. 5 illustrates the principle of the frequency-modulated current pulses in the primary converter 13. To transmit the frequency F0 (1/T0), pulses of 27 MHz are generated for example for a time T1 that is fixed. The period T0 is for its part variable.

FIGS. 6A and 6B describe the modifications that are applied to the error signals on the basis of the air gap. More specifically, if the voltage or the current varies at the output of the rectifier 23 with respect to the voltage or the current desired for the load, the frequency (1/T0) will change in the receiving part Rx.

For example, if the voltage is greater than the voltage desired for the load, the frequency (1/T0) increases in accordance with FIG. 6A. By contrast, if the voltage is lower, the frequency (1/T0) decreases as described in FIG. 6B.

According to the abovementioned regulation, the instruction at output of the receiving part Rx is compared and the error resulting from the comparison is sent to the transmitting part Tx.

If the error is other than zero, then the monitoring/control unit 14 will vary the control signals in order to adjust the power at output of the primary converter 13.

FIGS. 7 and 8 show two advantageous arrangement configurations of the communication coils 34 or 36 in relation to the power coils 10 or 20.

In this arrangement, the transmission coil 34 or reception coil 36 is concentric either about the secondary coil 20 or the primary coil (FIG. 7), respectively, or inside it (FIG. 8). By virtue of this arrangement, electromagnetic interference in the power transmitted by the power coils 10, 20 is minimized, or even eliminated.

Other variants and improvements may be provided without otherwise departing from the scope of the invention.

In the example of FIG. 4, the rectifier may be a half-wave rectifier, but an active rectifier may also be contemplated.

Likewise, although the half-wave rectifier may comprise four diodes that are parallel in pairs, a rectifier with just two diodes may also be contemplated.

For the secondary coupling module, in the same way as is performed for the primary coupling module, it is possible to contemplate placing a capacitor in series with the secondary power coil in order to optimize the energy transfer.

The expression "comprising a" should be understood to be synonymous with "comprising at least one" unless the opposite is specified.

What is claimed is:

1. Contactless and wireless electrical energy transfer assembly comprising:
   a transmitting part (Tx) comprising:
   a primary coupling module with at least one primary coil,
   a primary electronic module comprising at least one DC/AC electronic converter designed to convert a DC current into an AC electric current to be injected into the primary coil, and a monitoring/control unit for the DC/AC electronic converter;

a receiving part (Rx), comprising:

a secondary coupling module with at least one secondary coil designed to achieve magnetic coupling with the primary coil, a secondary electronic module including a rectifier designed to convert the AC electric current received in the secondary coil in order to transfer DC electrical energy to a load at output of the receiving part;

a system for regulating the energy transferred from the transmitting part (Tx) to the receiving part (Rx), comprising in the receiving part:

electronic measuring and shaping means for measuring the current and/or the voltage at the output of the rectifier and shaping it/them, at least one comparator designed to compare the measured voltage and/or the measured current with a voltage instruction and/or current instruction, and electronic shaping means that generate signals, called error signals, on the basis of the energy level required at Rx, a transmission antenna for transmitting the error signals, the transmission antenna having at least one magnetic induction coil that is separate and designed to operate at a frequency different from the secondary coil;

in the transmitting part:

a reception antenna for receiving the error signals transmitted from the transmission antenna, the reception antenna having at least one magnetic induction coil that is separate and designed to operate at a frequency different from the primary coil, electronic processing means for processing the error signals, connected at input to the reception antenna and at output to the monitoring/control unit that is designed to regulate the energy of the DC/AC electronic converter;

in which system said electronic shaping means for shaping the error signals allow a frequency modulation (1/T0) of the current pulses and/or voltage pulses of fixed duration (T1) on the side of the receiving part (Rx), said electronic processing means for processing the error signals allow a frequency demodulation (1/T0) of the error signals sent to the monitoring/control unit for the DC/AC electronic converter on the basis of the error signals, and wherein said respective transmission and reception antenna coils are wound concentrically to the secondary coil and the primary coil, respectively.

2. The electrical energy transfer assembly according to claim 1, wherein the electronic measuring means for measuring the current at the output of the rectifier comprise a shunt resistor at the output of the rectifier.

3. The electrical energy transfer assembly according to claim 1, wherein the electronic processing means comprise a complex programmable logic circuit.

4. The electrical energy transfer assembly according to claim 1, wherein the electronic shaping means continuously generate the error signals when energy is being transferred.

5. The electrical energy transfer assembly according to claim 1, wherein the electronic shaping means make it possible to modulate the duration T1 of the error signals in the receiving part Rx and then to demodulate the duration T1 in the transmitting part Tx so as to transmit data from the receiving part Rx to the transmitting part Tx.

6. The electrical energy transfer assembly according to claim 1, wherein the distance between the transmission antenna coil and the secondary coil, on the one hand, and between the reception antenna coil and the primary coil, on the other hand, is between 0 and 15 mm.

7. An embedded electronic system comprising the receiving part and the part of the regulation system in the receiving part of the electrical energy transfer assembly according to claim 1.

8. Use of the electrical energy transfer assembly according to claim 1 for supplying power to or charging embedded electronic systems through a wall, for a device in a harsh environment.

9. Use of the electrical energy transfer assembly according to claim 1 for supplying power to or charging rotating or moving electronic systems in a system.

* * * * *